United States Patent [19]
Makino et al.

[11] Patent Number: 5,327,414
[45] Date of Patent: Jul. 5, 1994

[54] SIGNAL RECORDING METHOD FOR OPTICAL DISK AND APPARATUS THEREFOR

[75] Inventors: Masami Makino; Satoshi Sumi, both of Gifu, Japan

[73] Assignee: Sanyo Electric Co., Ltd., Osaka, Japan

[21] Appl. No.: 136,617

[22] Filed: Oct. 15, 1993

Related U.S. Application Data

[63] Continuation of Ser. No. 493,648, Mar. 15, 1990, abandoned.

[30] Foreign Application Priority Data

Mar. 16, 1989 [JP] Japan ................................. 1-65503

[51] Int. Cl.$^5$ .......................... G11B 7/00; G11B 5/09
[52] U.S. Cl. ..................................... 369/116; 369/59; 369/47
[58] Field of Search ....................... 369/116, 47, 48, 54, 369/59, 111, 124, 109, 100, 60; 358/342; 250/201.5; 360/48, 40, 51; 341/95, 106

[56] References Cited

U.S. PATENT DOCUMENTS

| | | | |
|---|---|---|---|
| 4,337,458 | 6/1982 | Cohn et al. | 360/40 |
| 4,496,934 | 1/1985 | Furukawa | 360/40 |
| 4,866,692 | 9/1989 | Sato et al. | 369/59 |
| 4,873,680 | 10/1989 | Chung et al. | 369/54 |
| 4,894,816 | 1/1990 | Sukeda et al. | 369/54 |
| 4,928,187 | 5/1990 | Rees | 360/40 |
| 4,998,237 | 3/1991 | Osakabe et al. | 369/59 |
| 5,003,527 | 3/1991 | Matsumoto et al. | 369/100 |

OTHER PUBLICATIONS

"High-Density Magneto-Optic Disk Using Highly Controlled Pit-Edge Recording", BY: Sukeda et al, Proc. Int. Symp. on Optical Memory, 1987, Japanese Journal of Applied Physics, vol. 26 (1987), Supplement 26-4.

*Primary Examiner*—Aristotelis Psitos
*Assistant Examiner*—Thang V. Tran
*Attorney, Agent, or Firm*—Armstrong, Westerman, Hattori, McLeland & Naughton

[57] ABSTRACT

A signal recording method for an optical disk and an apparatus therefor wherein a turn-off duration, during which a laser beam is turned-off, of a binary signal to be recorded on the optical disk is elongated and an irradiation duration, during which the laser beam is irradiated, of the binary signal is shortened, so that it is possible to avoid influence of thermal diffusion which is caused by irradiating the laser beam corresponding to the irradiation duration on the optical disk and to obtain a more precise reproduced signal in comparison with that obtained by prior arts.

12 Claims, 6 Drawing Sheets

Fig. 3

| INPUT SIGNAL | ADDED SIGNAL | OUTPUT SIGNAL |
|---|---|---|
| 3 T | 0.5 T | 3.5 T |
| 4 T | 0.4 T | 4.4 T |
| 5 T | 0.3 T | 5.3 T |
| 6 T | 0.2 T | 6.2 T |
| 7 T | 0.1 T | 7.1 T |
| 8~11 T | 0 | 8~11 T |

Fig. 4

| PRECEDING SIGNAL \ INPUT SIGNAL | 3T | 4T | 5T | 6T | 7T~11T |
|---|---|---|---|---|---|
| 3T | 3.0 | 4.0 | 5.0 | 6.0 | 7~11 |
| 4T | 3.0 | 4.0 | 5.0 | 6.0 | 7~11 |
| 5T | 3.0 | 4.0 | 5.0 | 6.0 | 7~11 |
| 6T | 3.1 | 4.0 | 5.0 | 6.0 | 7~11 |
| 7T | 3.2 | 4.1 | 5.0 | 6.0 | 7~11 |
| 8T | 3.3 | 4.2 | 5.1 | 6.0 | 7~11 |
| 9T | 3.4 | 4.3 | 5.2 | 6.0 | 7~11 |
| 10T | 3.5 | 4.4 | 5.3 | 6.1 | 7~11 |
| 11T | 3.5 | 4.5 | 5.4 | 6.2 | 7~11 |

T = 230 nsec

SIGNAL RECORDING METHOD FOR OPTICAL DISK AND APPARATUS THEREFOR

This application is a Rule 62 continuation of application Ser. No. 07/493,648 filed Mar. 15, 1990, now abandoned.

BACKGROUND OF THE INVENTION

1. Field of the Invention

The present invention relates to a signal recording method for an optical disk and an apparatus therefor, and more particularly it relates to a signal recording method by a mark length recording system for erasable type optical disk and to an apparatus therefor.

2. Description of Related Art

In an optical disk drive unit in which an erasable type optical disk is used as a recording data medium, where a signal being outputted from an EFM (Eight to Fourteen Modulation) encoder is directly modulated by an optical modulation system and its mark length is recorded in the optical disk, and when its recording linear velocity becomes lower, a recorded bit is not precisely formed on the optical disk, then, there occurs such an apprehension as that sufficient reproduced waveforms can not be obtained. In order to avoid such apprehension, it is necessary to keep the recording linear velocity to be more than a predetermined value. There, then, still exists another apprehension that the value of the minimum limit of the recording linear velocity becomes so high that an area in which the recording linear velocity is usable becomes narrower, then, the maximum time for recording on the optical disk becomes shorter.

In order to avoid such another apprehension, as shown in "High-Density Magneto-Optic Disk Using Highly Controlled Pit-Edge Recording" (Proc. Int. Symp. on Optical Memory, 1987 *Japanese Journal of Applied Physics*. Vol. 26 '87 Supplement 26-4), there is proposed a method of adjusting a distribution of intensity of a laser power upon signal pulse by operating its circuit. By this method, however, the system construction becomes more complicated and sufficient characteristics for recording signal can not be obtained in the area of lower linear velocity.

FIG. 1(a), for example, shows a binary signal (signal to which EFM is applied) to be recorded on a magneto-optic disk. Laser beam is irradiated in response to a length of the value "1" of this signal and a laser irradiation bit is formed on the magneto-optic disk, and laser is turned off in response to the length of the value "0" of this signal and a laser turn-off bit is formed on the magneto-optic disk, respectively. FIG. 1(b) shows a laser output power in each of those cases being mentioned above. And in FIG. 1(c), the protruding portion shows the laser irradiation bit which is formed on the optical disk in response to the signal "1", and the recessed portion shows the laser turn-off bit which is formed on the optical disk in response to the signal "0", respectively.

As shown in FIG. 1(c), the laser irradiation bit grows to have more length than the input signal "1" because of thermal diffusion which is caused when the laser is irradiated on the magneto-disk, and the growth of the laser irradiation bit erodes and shortens the laser turn-off bit.

Because of such phenomenon as mentioned above, the laser irradiation bit will largely erode the laser turn-off bit in the area of lower linear velocity, then, sufficient characteristics can not be obtained when a reproduced signal is obtained.

SUMMARY OF THE INVENTION

The foregoing apprehension is overcome in accordance with the present invention, and it is a primary object of the present invention to provide a signal recording method for an optical disk and an apparatus therefor, wherein each bit can precisely be formed even in an area of low linear velocity in which it has been difficult to precisely record a mark.

According to the signal recording method for an optical disk of the present invention, a signal duration for a laser turn-off bit in a signal to be recorded on an optical disk is elongated and a signal duration for a laser irradiation bit in the signal to be recorded is shortened, then, it is possible to avoid influence from thermal diffusion which is caused when a laser beam is irradiated on the optical disk in response to the laser irradiation bit.

And the signal recording apparatus for an optical disk of the present invention is provided with, in a signal processing system in between an EFM encoder and an optical modulation recording unit, means by which the signal duration for the laser turn-off bit is elongated from the length of a recording bit of an EFM signal outputted from the EFM encoder and the laser irradiation bit is shortened from the same, then, it is possible to avoid influence from thermal diffusion which is caused when a laser beam is irradiated on the optical disk in response to the signal duration for the laser irradiation bit.

The above and further objects and features of the invention will more fully be apparent from the following detailed description with accompanying drawings.

BRIEF DESCRIPTION OF THE DRAWINGS

FIG. 3 is a schematic view showing the content of conversion table used in a first embodiment of the method of the present invention;

FIG. 4 is a schematic view showing the content of conversion table used in a second embodiment of the method of the present invention;

DESCRIPTION OF THE PREFERRED EMBODIMENTS

Now, embodiments of the present invention will be described below with reference to the accompanying drawings.

Figure 2:
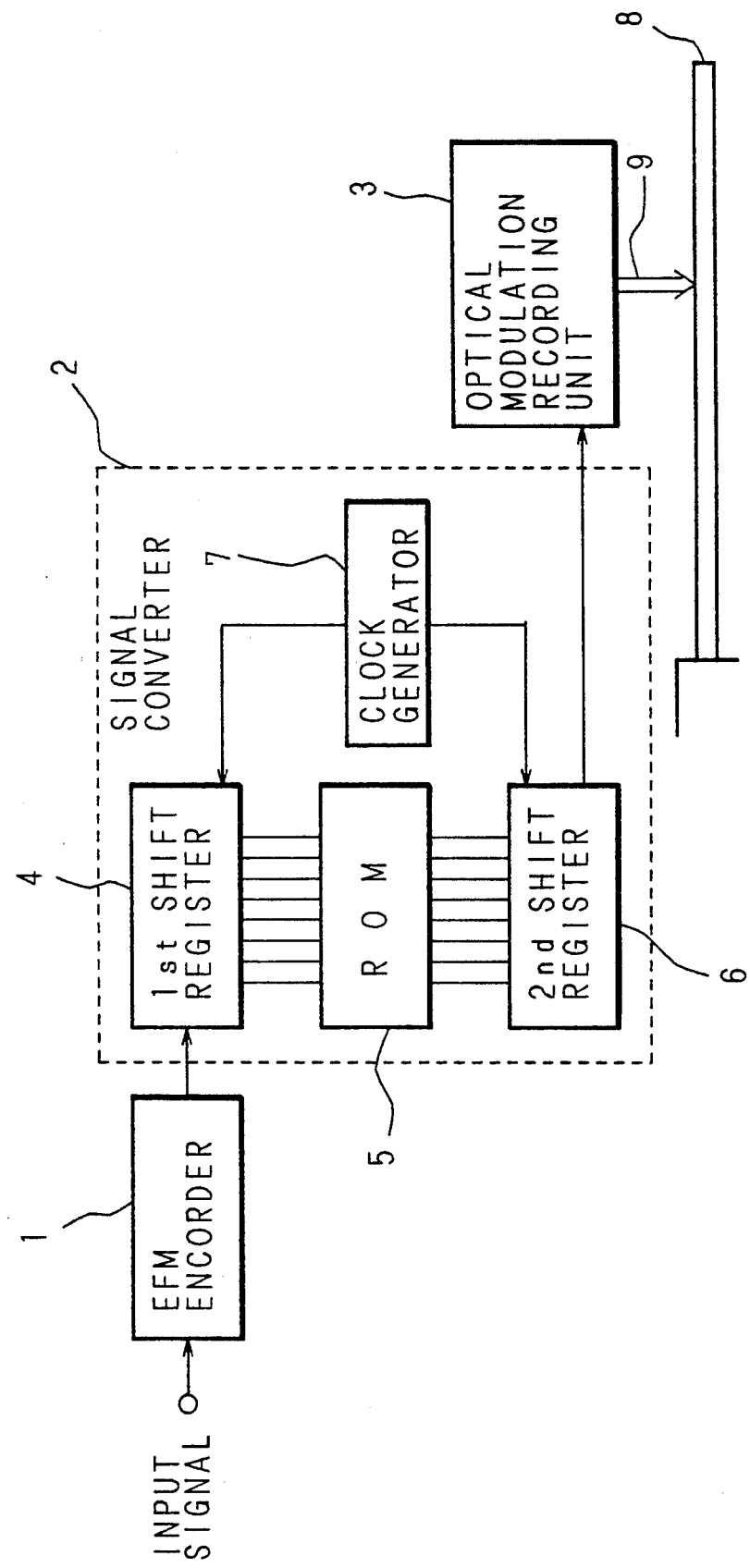
FIG. 2 is a block diagram showing one example of general construction of a signal recording apparatus for an optical disk in accordance with the present invention.

FIG. 2 is a block diagram showing construction of a signal recording apparatus for an optical disk in accordance with the present invention.

In the figure, reference numeral 1 designates an EFM (Eight to Fourteen Modulation) encoder, to which is inputted a source signal to be recorded on a magneto-optic disk 8. The EFM encoder 1 encodes the source signal to the coded data which has been modulated by EFM. The coded data is then inputted to a signal converter 2. This coded data is basically a signal to be recorded on the magneto-optic disk 8.

The signal converter 2 is comprised of a first shift register 4, a ROM 5, a second shift register 6, a clock generator 7, and the like.

The EFM coded data inputted to the signal converter 2 is inputted and once stored in the first shift register 4, and then, it is given to the ROM 5. The ROM 5 converts the inputted signal into a turn-off signal which is used for turning-off the laser beam in order to form a laser turn-off bit on the optical disk 8 by elongating the duration of the turn-off signal from the length of value "0" of the inputted signal, and an irradiation signal which is used for irradiating the laser beam in order to form a laser irradiation bit on the same by shortening the duration of the irradiation signal from the length of value "1" of the inputted signal according to contents of a conversion table (its contents will be described later) which have already been stored. The signals stored in the second shift register 6 are transmitted to an optical modulation recording unit 3 in synchronism with the first shift register 4 by the clock generator 7.

The optical modulation recording unit 3, then, converts the transmitted signals into durations of outputs of laser beam, and transmit them to an optical head (not shown), thereby, a mark with the length corresponding to the irradiation duration and the turn-off duration of the laser beam is formed on the magneto-optic disk 8.

FIG. 3 is a schematic view showing one example of the content of such conversion table which have already been stored in the ROM 5 as mentioned above.

In FIG. 3, reference character T designates 230 nsec, and each of three columns in the figure shows, in the order from the left to right, the length of value "0" inputted to the ROM 5, the length of an added signal to each of value "0" in the ROM 5, and the duration of the turn-off signal outputted from the ROM 5, respectively.

Figure 1:
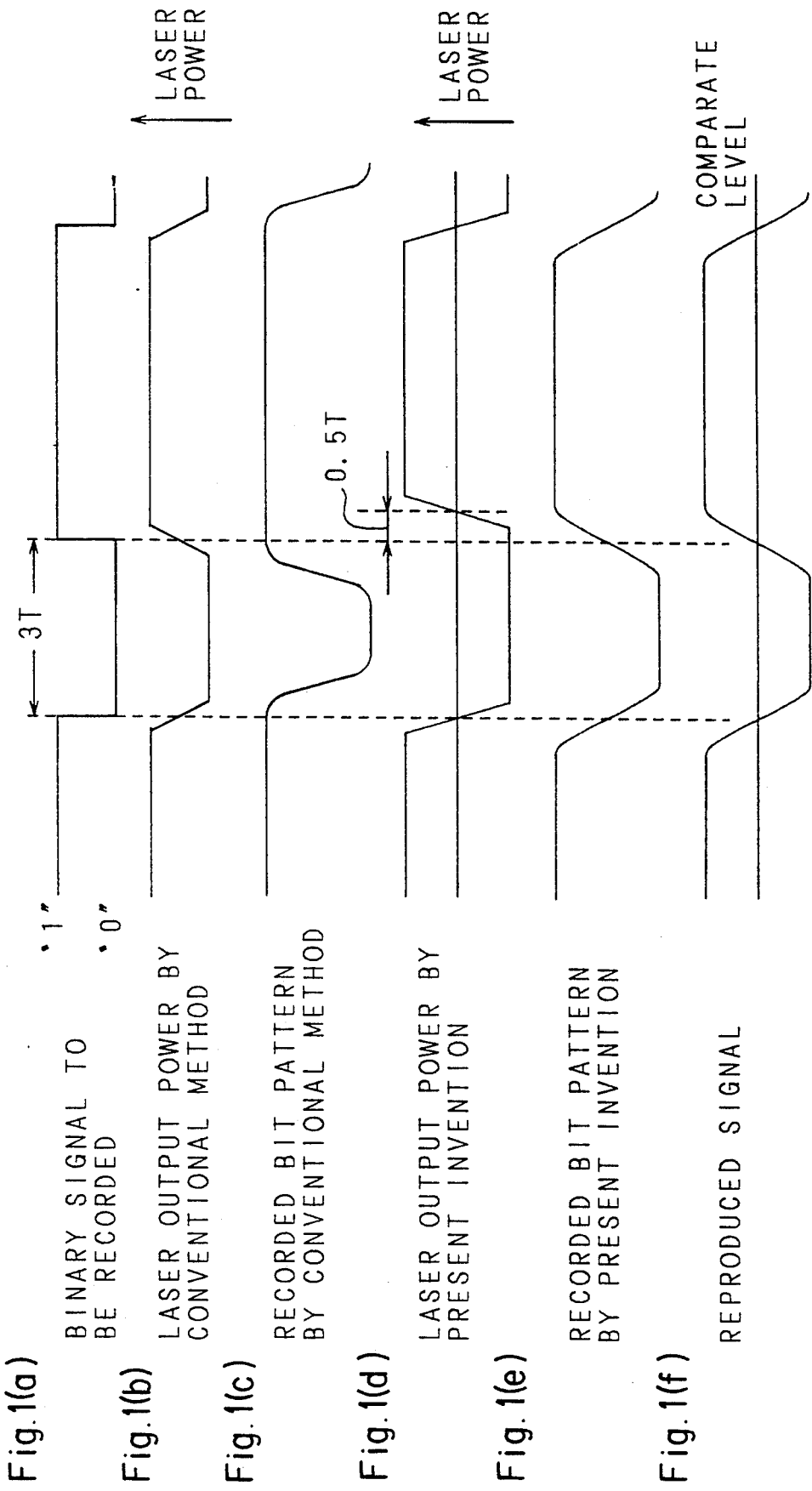
FIG. 1a-f is a schematic view showing a binary signal to be recorded on a magneto-optic disk and the states of a laser output power and a reproduced signal in response to the binary signal, and reference characters in the figure represent the following, respectively: (a), a signal to be recorded on the magneto-optic disk; (b), laser output power by a conventional method; (c), a bit pattern recorded on an optical disk by the conventional method; (d), laser output power by a method of the present invention; (e), a bit pattern recorded on the optical disk by the method of the present invention; and (f), a reproduced signal obtained from the bit pattern of (e)

As can be seen from the figure, where a length of value "0" of input signals from the EFM encoder 1 to the first shift register 4 is 3T, a signal with the length of 0.5T is added to it to be the laser turn-off signal with the duration of 3.5T, which being outputted to the second shift register 6. Similarly, to each of signals of value "0" with the lengths of 4T, 5T, 6T, and 7T in input signals, signals with the lengths of 0.4T, 0.3T, 0.2T, and 0.1T are added, respectively, which being outputted as the turn-off signals with the durations of 4.4T, 5.3T, 6.2T, and 7.1T respectively. For the signal of value "0" with the length of 8T through 11T, no length is added to it, and is outputted to the second shift register 6 just as it is.

Where a length of value "0" of the inputted signal from the first register 4 to the ROM 5 is 3T, for example, the duration of the turn-off signal outputted from the ROM 5 to the second shift register 6 becomes 3.5T. In that case, as shown in FIG. 1(d), duration of 0.5T is elongated from the length 3T of the original signal, however, a laser turn-off bit generated from the turn-off signal is slightly shortened as shown in FIG. 1(e) because of the growth caused by thermal diffusion of a laser irradiation bit adjacent to it on the magneto-optic disk 8. As a result, as shown in FIG. 1(f), there is obtained a reproduced signal with the length substantially equal to the length of 3T of value "0" which is inputted from the EFM encoder 1 to the signal converter 2.

In FIG. 1(f), it is shown that the portion with more than a predetermined comparate level in those reproduced signals obtained from the optical disk is generated as the signal "1", so is the portion less than the predetermined comparate level as the signal "0", respectively.

FIG. 4 is a schematic view showing the content of conversion table used in the second embodiment of the present invention.

In this second embodiment, elongation of the duration of a turn-off signal is decided not only according to the lengths of each of the signal of value "0" but by taking the length of a signal of value "1" preceding the signal of value "0" into consideration, when it is converted.

In other words, even where the length of value "0" is 3T and the length of value "1" preceding that is 3T through 5T, the duration of the output turn-off signal is left to be 3T, and where the length of value "1" preceding that is 6T, the duration of the output turn-off signal is elongated by 0.1T and is converted to be 3.1T, and then, in cooperation with elongation of the length of value "0" preceding the value "1", the duration of the turn-off signal outputted from the ROM 5 is converted so that it can be longer. When the turn-off signal is elongated, a irradiation signal following that is shortened by equal to the elongated length of the laser turn-off signal.

To be concrete, where a signal of value "1" with the length of 11T, a signal of value "0" with the length of 4T, and a signal of value "1" with the length of 9T, for example, are successively inputted, the length of the signal of value "1" inputted preceding the signal of value "0" with the length of 4T is 11T in the ROM 5, and the signal of value "0" is elongated by 0.5T and is converted into a turn-off signal having the duration of 4.5T. And the signal of value "1" with the length of 9T inputted next to the signal of value "0" is shortened by 0.5T and is converted into an irradiation signal having the duration of 8.5T. As a result, those signals are outputted from the ROM 5 to the second shift register 6 in the order from the irradiation signal with the length of 11T, the turn-off signal with the length of 4.5T, to the irradiation signal with the length of 8.5T.

Figure 5:
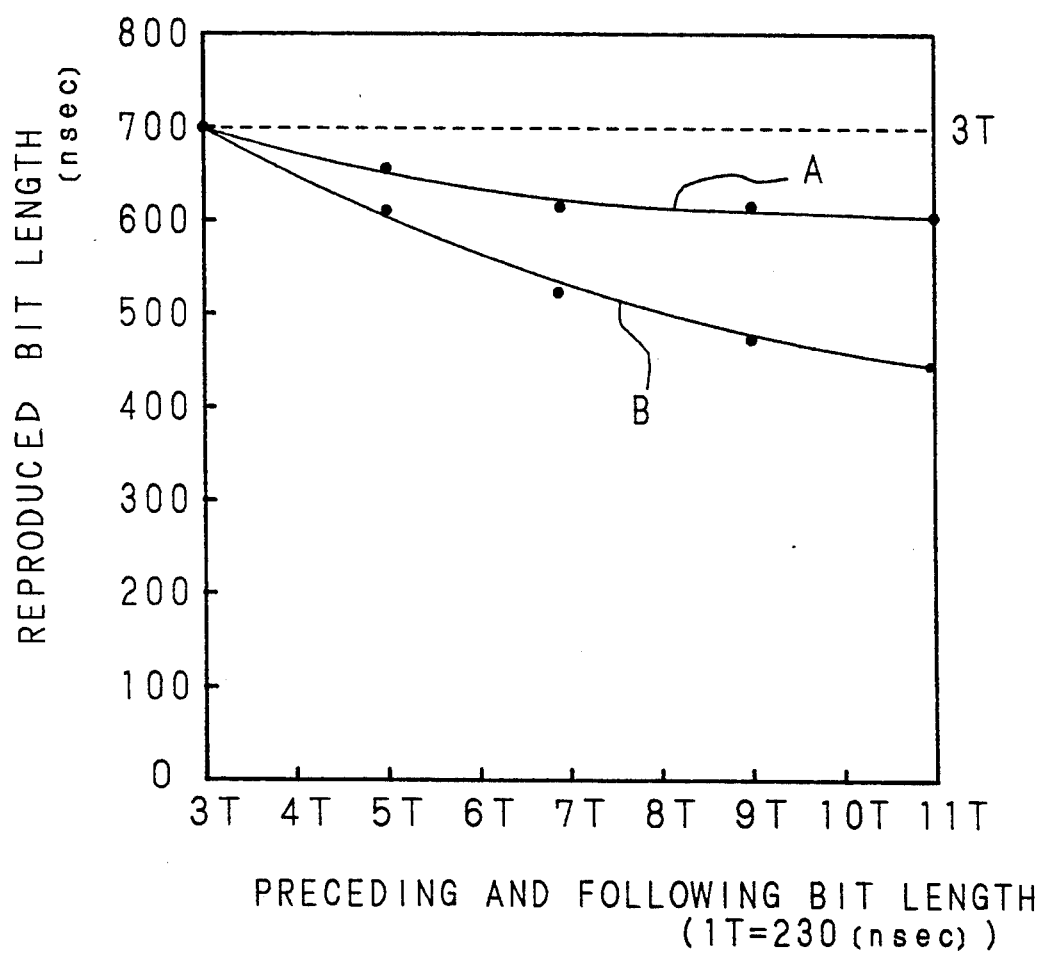
FIG. 5 is a graph showing the relationship between the state of a reproduced signal of the laser turn-off bit by the conventional method and the present invention and the lengths of the laser irradiation bits preceding and following the reproduced signal.

FIG. 5 is a graph showing the state of a reproduced signal in the case where the laser turn-off bit with the length of 3T, which length is most readily affected by the laser irradiation bits preceding and following the turn-off bit when the signal is recorded by an EFM system at a low linear velocity, is recorded on the magneto-optic disk 8 after the duration of the laser irradiation signals preceding and following that are changed. In the graph of FIG. 5, the axis of abscissa shows the bit lengths (unit: T=230 nsec) of the laser irradiation bits preceding and following the laser turn-off bit, and the axis of ordinate shows the bit length (unit: nsec) of a reproduced signal from the laser turn-off bit, respectively.

In FIG. 5, the curve with the reference character A shows the case by the method of the present invention, and the curve with the reference character B shows the case by the conventional method, respectively.

From the both curves in FIG. 5, it can be seen that where the length of the laser irradiation bits preceding and following the laser turn-off bit is longer, the laser turnoff bit in between the laser irradiation bits takes larger influence of thermal diffusion caused by the laser irradiation bits, then, its reproduced signal becomes shorter than 3T. And it can be clear that the shortage rate of the reproduced signal is smaller in the case by the method of the present invention shown by the curve with the reference character A than in the case by the conventional method shown by the curve with the reference character B. As a result, in the case by the method of the present invention, it can be said that influence of the laser irradiation bits preceding and following the laser turn-off bit upon the reproduced signal of the laser turn-off bit with the length of 3T is more largely eliminated than that in the case by the conventional method.

In addition to the case of the laser turn-off bit with the length of 3T, the same effect can be obtained in the cases of laser turn-off bits with the lengths of 4T and 5T.

Figure 6:
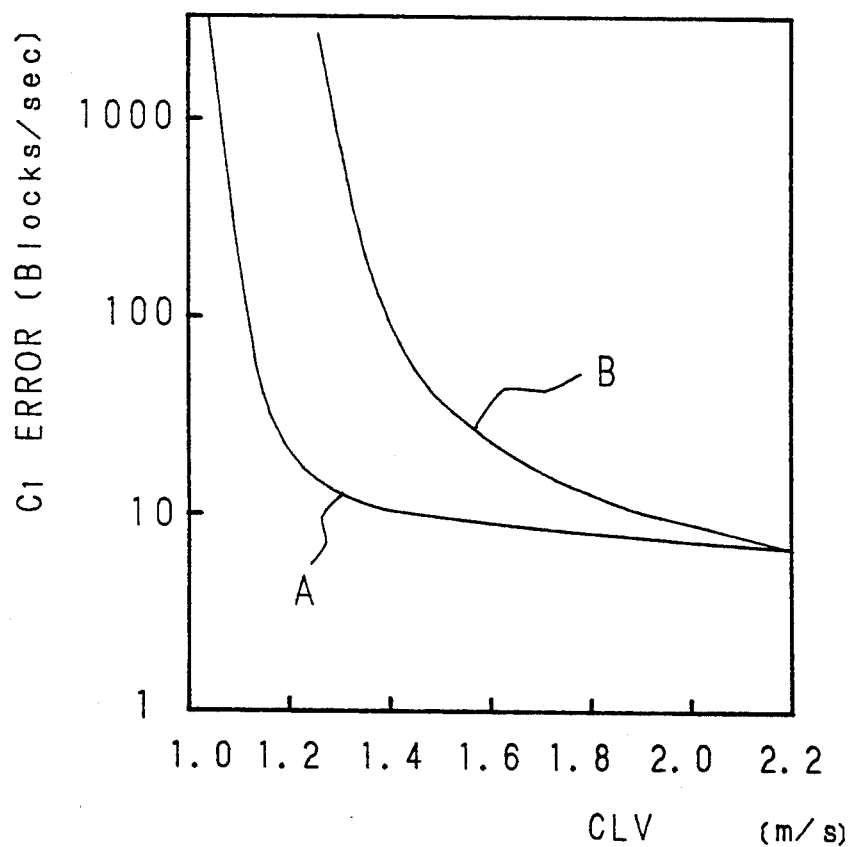
FIG. 6 is a graph showing the relationship between the linear velocities by the conventional method and the present invention and a $C_1$ error generation rate.

Similarly to the case shown in FIG. 5, a graph of FIG. 6 shows the relationship between the linear velocity and the $C_1$ error generation rate, with the curve with the reference character A showing the case by the method of the present invention and the curve with the reference character B showing the case by the conventional method, respectively. In the graph of FIG. 6, the axis of abscissa shows the linear velocity (unit: m/sec), and the axis of ordinate shows the $C_1$ error generation rate (unit: the number of error block/sec), respectively.

The $C_1$ error designates an error in one block of data with 588 bits, and if there should exist any error of a single bit in one block, the block is made to be an error. In this embodiment, there are recorded 7350 blocks for a second.

It can be seen from FIG. 6 that the $C_1$ error generation rate at the lower linear velocity is comparatively smaller by the method of the present invention in comparison with that by the conventional method. As a result, according to the present invention, it becomes possible to record and reproduced signal in the area of lower linear velocity than by the conventional method.

It is not intended that the method of elongating the duration of the turn-off signal according to the conversion table be limited to those of the embodiments shown in FIGS. 3 and 4, and it is needless to say that other methods may be employed. In addition to it, the signal converter 2 can employ, as a replacement of the ROM 5, a digital filter, one shot multi-vibrator, and the like.

In the aforementioned embodiment, the conversion table are arranged so that the duration of the turn-off signal can be elongated, however, it is needless to say that substantially the same effect can be obtained by such construction as that the conversion table are arranged so that the duration of the irradiation signal can be shortened and the duration of the turn-off signal next to that can be elongated by the shortened duration of the irradiation signal.

As has been described above, compared to the case by the conventional method, an EFM signal can more correctly be recorded at the lower linear velocity by the method of the present invention, then, it is possible to increase the recording capacity of the optical disk and to realize substantially practical and stable signal recording even in the area of comparatively lower linear velocity in which less stable signal recording has been carried out.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A signal recording method for an optical disk, comprising the steps of:
   irradiating a laser beam on a rotating optical disk for an irradiation duration corresponding to a length of one value of a binary signal to be recorded;
   non-irradiating of the laser beam on said optical disk for a turn-off duration corresponding to a length of the other value of the binary signal; and
   forming a mark with the length corresponding to the irradiation duration and the turn-off duration of the laser beam on said optical disk so as to record said binary signal,
   wherein the irradiation duration and turn-off duration are changes according to at least one of the length of corresponding said one value and the length of corresponding said other value of the binary signal which have been converted based on a conversion table, said conversion table including a converted value representative of a duration of an outputted turn-off signal, and
   wherein said step of forming a mark comprises the steps of:
   receiving and storing said binary signal into a storing means and outputting said binary signal from said storing means, compensating, based on said conversion table, said outputted binary signal dependent on the length of one of said value and said other value of said received binary signal, and storing a converted signal into another storing means, outputting said converted signal once stored therein into an optical modulation recording unit, and forming said mark on said optical disk based on said converted signal.

2. A signal recording method for an optical disk as set forth in claim 1, wherein the turn-off duration is elongated and the irradiation duration is shortened.

3. A signal recording method for an optical disk as set forth in claim 2, wherein the turn-off duration is elongated in inverse proportion to the length of corresponding said other value of the binary signal.

4. A signal recording method for an optical disk as set forth in claim 2, wherein the turn-off duration is elongated according to the length of corresponding said other value of the binary signal and the length of said one value of the binary signal preceding to said other value.

5. A signal recording apparatus for an optical disk, comprising: a laser beam for irradiating on a rotating optical disk for an irradiation duration corresponding to a length of one value of a binary input signal to be recorded by an optical modulation unit, and for non-irradiating on said optical disk for a turn-off duration corresponding to a length of the other value of the binary signal by said optical modulation unit, so that mark with the length corresponding to the irradiation duration and the turn-off duration is formed on said optical disk so as to record said binary signal, said signal recording apparatus further comprising:

a signal converter having a first shift register means for once storing said binary signal and for outputting said binary signal once stored, a converter means operably coupled to said first shift register means for receiving said binary signal outputted from said first shift register means and for compensating the irradiation duration and the turn-off duration to another signal in accordance to at least one of the length of corresponding one value and the length of corresponding said other value of the received binary signal based on a conversion table stored in said converter means, and a second shift register means for storing and outputting the converted signal to said optical modulation unit in synchronous with an output timing of said first register means, said conversion table including a converted value representative of a duration of an outputted turn-off signal.

6. A signal recording apparatus for an optical disk as set forth in claim 5, wherein said signal converter elongates the turn-off duration and shortens the irradiation duration.

7. A signal recording apparatus for an optical disk as set forth in claim 6, wherein said signal converter elongates the turn-off duration in inverse proportion to the length of corresponding said other value of the binary signal.

8. A signal recording apparatus for an optical disk as set forth in claim 6, wherein said signal converter elongates the turn-off duration according to the length of corresponding other value of the binary signal and to the length of said one value of the binary signal preceding to said other value.

9. A signal recording apparatus for an optical disk, comprising:

an EFM (Eight to Fourteen Modulation) encoder which is inputted a binary signal to be recorded on the optical disk, which encodes the inputted signal by applying the EFM, and which outputs a coded binary signal;

a signal converter having a first register means for receiving and storing therein said binary signal, a converter operably coupled to said first register means for converting an irradiation signal having a duration based on a length of corresponding one value of the binary signal and a turn-off signal having a duration based on a length of corresponding the other value of the binary signal, and compensating the duration of said irradiation signal and the duration of said turn-off signal according to at least one of the length of said one value and the length of said other value of the received binary signal based on a conversion table stored in said converter, and a second register means for storing and outputting the converted signal in synchronous with an output timing of said first register means, said conversion table including a converted value representative of a duration of an outputted turn-off signal; and an optical modulation recording unit which is inputted said converted signal, and which irradiates a laser beam on the rotating optical disk corresponding to the duration of the converted irradiation signal and turn-off signal.

10. A signal recording apparatus for an optical disk as set forth in claim 9, wherein said signal converter further comprises a clock generator which generates a clock, said clock generator being operably coupled to said first and second register means, wherein said converter of said signal converter comprises a ROM which is inputted the outputted signal from said first shift register, said ROM including said conversion table for converting the duration of the irradiation signal to shorten from the length of corresponding said one value of the binary signal and the duration of the turn-off signal to elongate from the length of corresponding said other value of the binary signal according to the length of said one value or said other value of the binary signal, and said ROM outputting the converted signal to said second register means.

11. A signal recording apparatus for an optical disk as set forth in claim 10, wherein said ROM has a conversion table which converts the duration of the turn-off signal to elongate in inverse proportion to the length of corresponding said other value of the binary signal for turning-off the laser beam, which converts the duration of the irradiation signal to shorten by a duration equal to the elongated duration of said turn-off signal, and which outputs the converted signal.

12. A signal recording apparatus for an optical disk as set forth in claim 10, wherein said ROM has a conversion table which converts the duration of the turn-off signal to elongate from the length of corresponding said other value of the binary signal and the duration of the irradiation duration preceding to said turn-off signal to shorten from the length of corresponding said one value of said binary signal, and which outputs the converted signal.

* * * * *